Sept. 13, 1960   V. E. MATULAITIS   2,952,102
SINGLE POINT TOOL GRINDER
Filed Aug. 29, 1957   6 Sheets-Sheet 1

INVENTOR.
Victor E. Matulaitis
BY
ATTORNEY

Sept. 13, 1960         V. E. MATULAITIS         2,952,102
              SINGLE POINT TOOL GRINDER
Filed Aug. 29, 1957                          6 Sheets-Sheet 2

INVENTOR.
Victor E. Matulaitis
BY

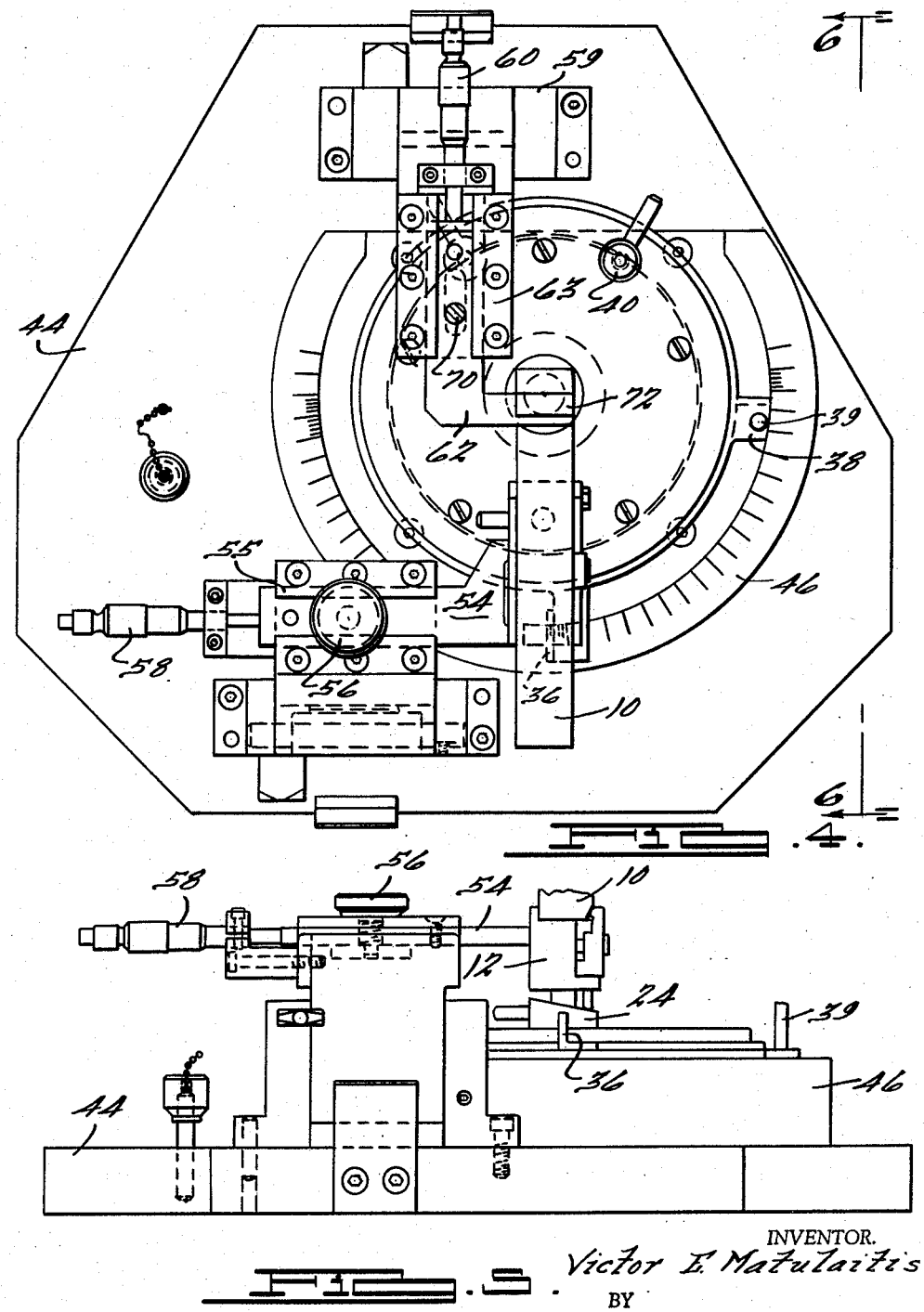

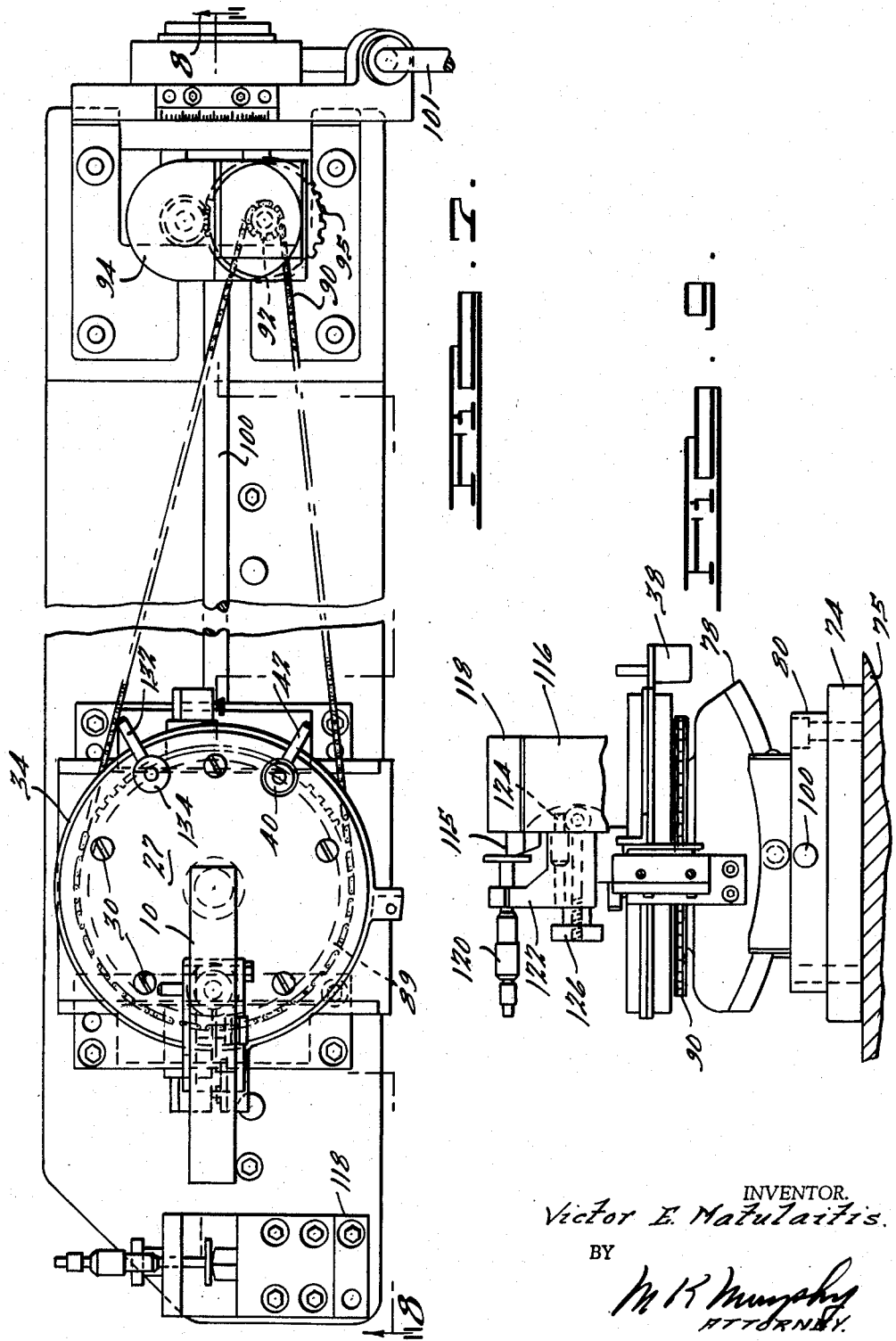

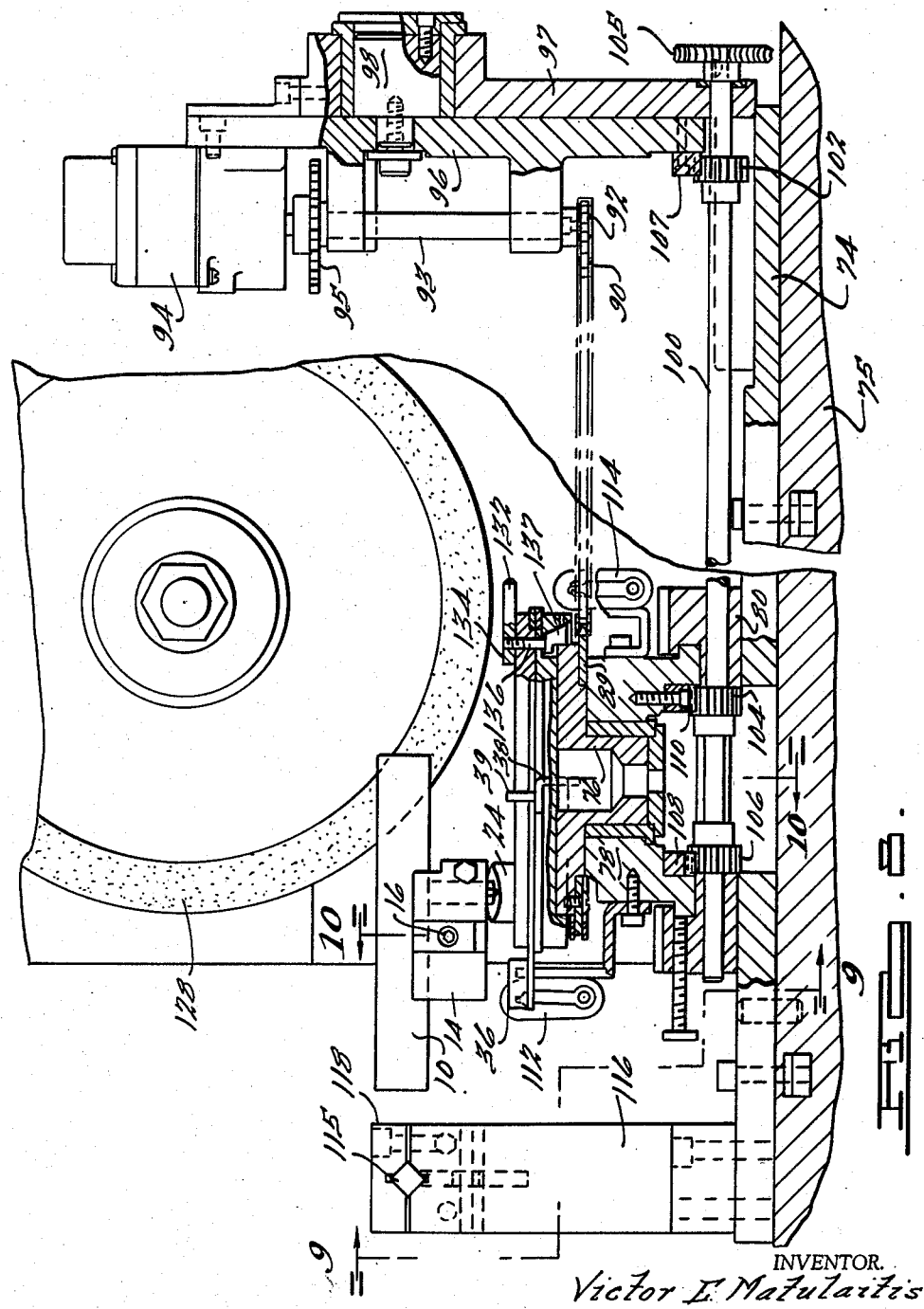

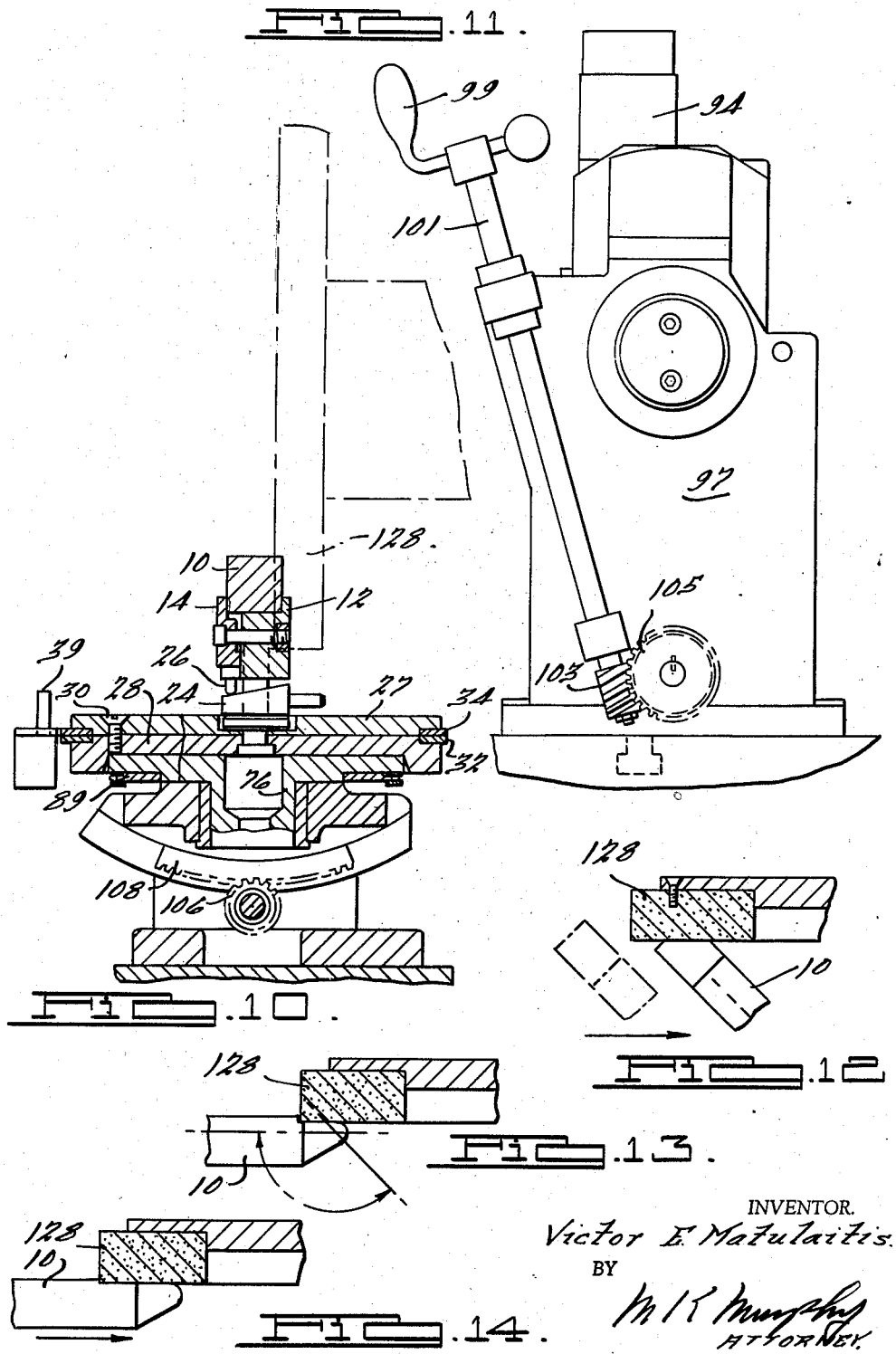

United States Patent Office 2,952,102
Patented Sept. 13, 1960

2,952,102

SINGLE POINT TOOL GRINDER

Victor E. Matulaitis, Franklin, Mich., assignor to Elox Corporation of Michigan, Royal Oak, Mich., a corporation of Michigan Filed Aug. 29, 1957, Ser. No. 681,032

5 Claims. (Cl. 51—124)

This invention relates generally to the field of sharpening single point cutting tools and specifically to an improved method and apparatus for automatically forming the complete end contour of a single point cutting tool by electrical-discharge grinding.

The primary object of the invention is to provide fully automatic means for grinding a single point tool including the grinding of the desired angles on the tool faces both in plan and elevation and the forming of a true desired radius tangential to both tool face planes.

Another object is to provide a method and means for grinding the tool accurately to desired contour automatically with complete elimination of tolerances due to operator errors.

Still another object is to provide improved grinding means for sharpening composite tools (of the steel shank and tungsten carbide insert type for example) by electrical discharge machining (sometimes called spark-machining or arc-machining) thereby avoiding glazing of the grinding wheel as frequently occurs with conventional methods.

A further object is to provide an improved means and method whereby all necessary adjustments which determine tool face angles and radius are performed away from the grinding machine proper as, for example, on an adjacent bench. This permits the operator to perform the necessary set-up operations during the period that a second tool is being sharpened automatically on the grinder, thus increasing the capacity of the grinder.

Other objects and advantages will become apparent from the following specification which, taken in conjunction with the accompanying drawings, describes a preferred embodiment of the invention.

In the drawings wherein reference characters have been used to designate like parts referred to herein, Fig. 1 is a plan view of the tool holder;

Fig. 4 is a plan view of the set-up fixture which is used to properly align the tool to be ground with respect to the tool holder;

Fig. 5 is a side view of the same;

Fig. 6 is a section taken along the line 6—6 of Fig. 4;

Fig. 7 is a plan view of the grinding fixture with the tool holder in place;

Fig. 8 is a part-sectional view taken on the line 8—8 of Fig. 7;

Fig. 9 is a part sectional view taken on the line 9—9 of Fig. 8;

Fig. 10 is a part-sectional view taken on the line 10—10 of Fig. 8;

Fig. 11 is an end view of the grinding fixture;

Figs. 12, 13 and 14 are schematic representations of the tool and grinding wheel at different stages of the grinding operation; and Fig. 15 is a partial plan view of the grinder table, slide and limit switch.

Figure 1:
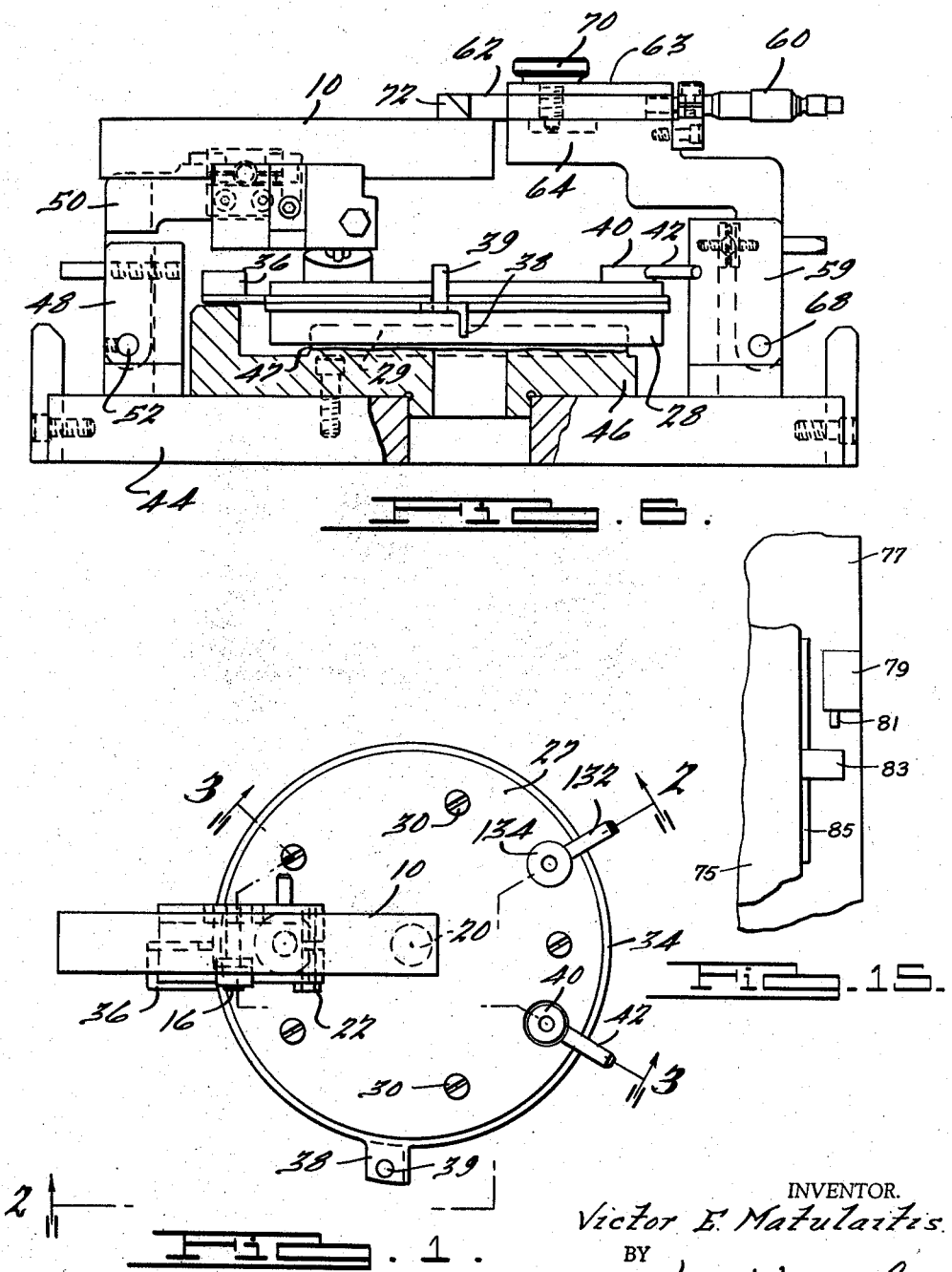
Figure 2:
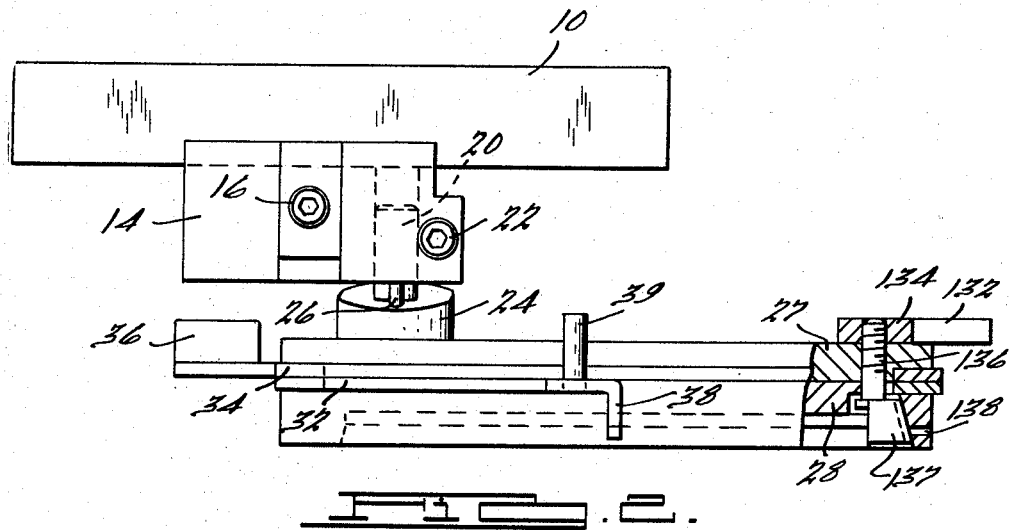
Fig. 2 is a side view on a larger scale of the same, partially in section as indicated by line 2—2 of Fig. 1.
Figure 3:
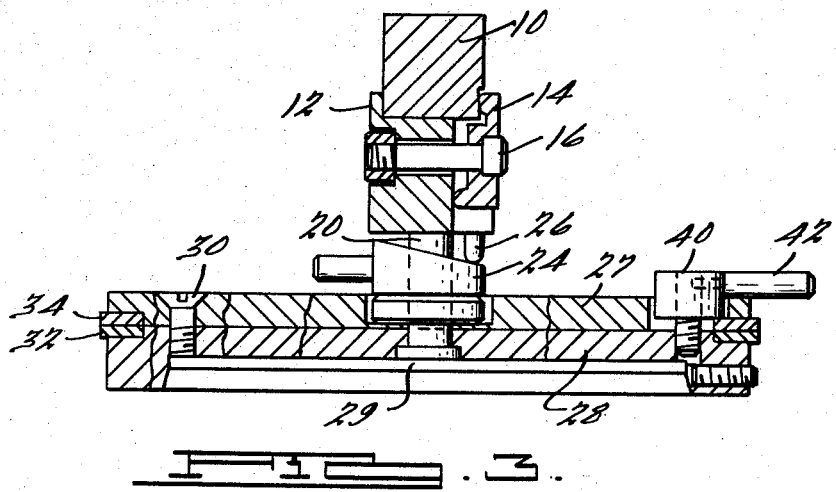
Fig. 3 is a section on a larger scale taken along the line 3—3 of Fig. 1.

Referring to Figs. 1 to 3 inclusive of the drawings, which show details of the tool holding fixture, it will be seen that the tool 10, which may be a typical carbide tipped steel shank, is clamped against the shoulder of a tool holding block 12 through the medium of the clamping plate 14 and locking screw 16. The tool holder is pivotally mounted on the pin 20 and may be moved about the axis of the pin and clamped in any selected rotational position by lock screw 22. The vertical position of block 12 on pin 20 is fixed by the cam 24 which has a sloping annular surface disposed in contact with a pin 26 carried by the block 12.

The base of the tool holder comprises a pair of circular members 27, 28, secured together by screws 30. This base is suitably recessed to accommodate the relatively thin annular members 32, 34. The member 34 carries a radial tab 36 which has an upstanding portion and the member 32 carries a similar tab 38 which has a downwardly turned portion as shown. The tab 38 also carries a pin 39 which protrudes upwardly for a purpose to be described. The tab 36 and the pin 39 may be engaged by the fingers of the set-up operator to rotate the members 32, 34, relatively to one another and to the base. A locking head 40 is provided to clamp the members in selected position. The latter has a threaded portion engaged in a threaded hole in the plate 28 and is actuated by pins 42, the latter being disposed such that they do not extend beyond the edge of the plates 27, 28, when in locked position. A second locking head 134 is carried by the tool holder, the purpose of which will be explained below.

Reference is made now to Figs. 4, 5 and 6, which show details of the set-up fixture which is disposed on a bench separate from the grinding machine. The set-up fixture consists essentially of a base plate 44 on which is fixedly mounted the pilot member 46. The latter is marked off in degrees of angle from minus ten degrees to plus ninety degrees for reasons which will subsequently appear.

Mounted on the base plate 44 is a support 48 which carries an arm 50 rockable on a pin 52. The latter supports a stop member 54 in suitably machined ways 55, a lock screw 56 being provided to clamp the member 54 in selected position. A micrometer 58 is also mounted on the support in such manner that the slide 54 can be accurately positioned with respect to a line passing through the center of the pilot member 46 and the ninety degree mark on the protractor scale.

In like manner, a support 59 mounted on the opposite side of the plate 44 supports an arm 64 pivotally mounted on pin 68. The arm 64 carries a stop member 62 in ways 63 and a micrometer 60. A lock screw 70 is provided for clamping the member 62.

As described so far, it may be seen that a tool to be sharpened, such as 10, may be loosely clamped in the holding fixture by manually tightening the lock screw 16. The arms 50 and 64 of the set-up fixture are then swung out of position and the tool holder is dropped into the set-up fixture, the hub portion 47 thereof being received in the opening 29 of plate 28. The arms 50 and 64 are then swung back to the position shown.

Slide or stop member 54 is then positioned by manipulation of micrometer 58 to desired position and is locked by screw 56. Tool holding block 12 is then moved into such position that it bears firmly against the stop member 54 as shown in Fig. 4. This determines the location of the center point of the tool nose radius relative to the face of the tool.

Next cam 24 is rotated to bring the upper surface of the tool into contact with the underside of the angularly disposed end portion 72 of the slide or stop member 62

(see Fig. 6). This operation locates the correct elevation of the tool. Lock screw 22 is then tightened to lock the holding block 12 to pin 20.

Next the tool 10 is slid lengthwise in the holder until a desired portion thereof projects inwardly of the end 72 of the slide 62 (the slide 62 having been previously located by manipulation of the micrometer 60 and locked in place). The tool holder is then rotated by manual engagement of tabs 36, 38, and visual observation will then show what portion of the tool bit will be removed by the machining operation. In other words, the end 72 of the slide 62 acts as a reference line corresponding to the plane of the face of a cup type grinding wheel, and manual rotation of the tool holder at this point gives the set-up operator a visual picture of the material removal about to take place. The tool 10 is then firmly locked in the holder by tightening screw 16.

Next, with the block 12 held firmly against the end of slide 54, as shown in Fig. 5, the tabs 36 and 38 are aligned with selected graduations of the degree scale on block 46. The lock head 40 is then actuated to lock the parts in place. The positioning of tabs 36 and 38 determines the planes of the two flat faces of the tool in plan view.

The set-up operation is now complete and the tool holder is removed from the set-up fixture and placed in the grinding fixture (see Figs. 7 to 11 inclusive). The grinding fixture is designed to be mounted on the slide 75 of a regular tool grinder, and comprises a base plate 74 on which is mounted a rotary table 76 which receives the tool holder. The table 76 is mounted in a block 78 and the latter is mounted in arcuate ways in a member 80 which is in turn rigidly attached to base plate 74. The mating ways in members 78, 80, permit table 76 to be swung about a horizontal axis parallel with the slide of the machine. This axis is tangent to or passes through the top surface of the tool.

It will be seen that when the tool holder has been clamped on the rotary table 76, the tool can be rotated around the vertical axis of the table and around the horizontal axis of the ways, and the intersection of these axes is fixed in space. The table 76 is rotated by means of a chain 90 which engages a toothed member 89 carried by the table and a pinion sprocket 92. The latter is carried by shaft 93 driven by an electric motor 94 through suitable reduction gearing 95.

The drive means for the table 76 is mounted on a plate 96 which is swingably mounted by means of a bearing 98 on the upright support 97. A shaft 100 carries a gear 102 disposed in mesh with a sector 104 carried on plate 96. The shaft also carries gears 105, 106, which mesh with sectors 108, 110, fixed on member 78. Rotation of shaft 100 is accomplished by hand crank 99 (Fig. 11) and shaft 101. The latter carries a worm 103 which meshes with worm wheel 105 fixed on the outer end of shaft 100. It will thus be seen that rotation of crank 99 will simultaneously rock member 78 and plate 96 and thus maintain proper orientation of the drive motor and table 76.

The grinding fixture also carries a dressing tool holder 116 which is mounted on the base 74 and carries a dressing tool 115. The latter is clamped in the holder by a block 118. To accurately position the dressing tool in the holder, a micrometer 120 is mounted in a support 122 such that it can engage the end of the dressing tool 115 (Fig. 9). Locating pins 124 and clamping screw 126 permit the tool to be accurately positioned for dressing the wheel 128.

As aforementioned, the grinding fixture is mounted to the bed of a conventional grinding machine having driving means for the wheel 128 and means for traversing the slide 75 horizontally.

In grinding a tool, the following procedure is followed:

The micrometer 120 is set to a desired reference point, for example at midstroke, and the dressing tool 115 correspondingly set and clamped. The dressing tool will then lie in a plane normal to base 74. The micrometer and support are then removed from the fixture, and the grinding machine slide is actuated to cause the dressing tool to face off or dress the operating face of the grinding wheel 128. This makes the grinding face tangent to the desired axis of cutting.

The slide is then moved to the left and the tool holder is placed on the table 76 and rotated until tab 38 engages the arm of micro-switch 114. The tool holder is then locked in place by means of pin 132. This rotates cap 134 (see Figs. 2 and 8) which causes an upward axial movement of pin 136 because of the threaded engagement of these parts. The pin 136 has an integral lower end piece 137 which is inclined on one side and which has a groove engaged by pin 138. Because pin 136 is prevented from turning by pin 138, upward movement thereof causes an accompanying radial inward movement which locks the tool holder to the table 76.

Next the desired side clearance and front clearance angles to be ground on the tool 10 are set by rocking the member 78 and plate 96 through manipulation of the crank 99. Grinding of the tool 10 automatically by means of electrical-discharge-machining now begins.

The first operation is to grind one face of the tool by translating the slidable grinding table in the direction of the arrow in Fig. 12. The wheel 128 is, of course, rotating, and the grinder table is translated by servo-means (not shown) as is done in conventional grinding. In grinding by electrical-discharge-machining, commonly referred to as EDM, the wheel does not physically contact the tool, the stock being eroded away by spark or arc discharge. In the interest of brevity, I have not shown the EDM apparatus. For a disclosure of apparatus suitable for use with the mechanism being described to provide the erosive discharge between the grinding wheel (which is preferably of brass) and the tool, reference is made to my copending application Serial No. 459,703, filed October 1, 1954, now U.S. Patent No. 2,804,575.

Before the grinder table movement has caused the tool 10 to completely traverse the face of the cup-wheel 128 as indicated in Fig. 12, an adjustable stop 83 engages limit switch 79 and stops traversal of the grinder table and energizes motor 94. The switch 79 is mounted on the frame 77 of the grinder and has a plunger 81 engageable by the stop 83 which is adjustable along the slide 85. The switch 79 is interlocked with the switch 114 such that depression of the plunger 81 stops traverse of the table and activates the circuit to motor 94. This causes rotation of table 76, swinging the tool 10 through the arc indicated by the arrow in Fig. 13. This operation grinds the radius on the tool tip. Rotation of the table 76 is stopped by engagement of tab 36 with the arm of limit switch 112. Actuation of the switch 112 stops motor 94 and again energizes the grinder table servo-motor which then continues its forward movement, as indicated by the arrow in Fig. 14, to grind the side face of the tool as shown.

Translation of the grinder table forwardly is stopped by another limit switch (not shown) which has been previously set and which preferably shuts down the entire machine.

It will thus be seen that I have provided an improved means, method and apparatus for grinding single-point tools, which is particularly useful when used with EDM, but which is by no means limited to use with such apparatus. My improved method and apparatus is also applicable to grinding with diamond wheels, etc.

In the interest of brevity, I have omitted details of the EDM power supply and circuit. It will be understood that the grinding wheel 128 is connected to the negative side of a suitable electrical-discharge-machining circuit and that the workpiece (tool 10) is connected to the positive side of the circuit. Suitable power supply means and pulsing control means is provided to cause intermittent electrical discharge across the gap between the wheel 128 and the tool 10 of such frequency, voltage and current as is best suited under the conditions encountered. For a disclosure of suitable apparatus and circuitry for use with the mechanism just described, reference is made to my Patents Nos. 2,804,575, and 2,866,921, and my Patent 2,794,152, issued May 28, 1957. These patents describe suitable apparatus, but my invention as herein described may be used with other EDM apparatus and circuitry to provide different or improved results.

I claim:

1. In combination with a tool grinder having a linearly reciprocating table and a grinding wheel rotatably mounted on a horizontal axis in selected perpendicular relationship to said table, a holding fixture for holding a tool blank, means for mounting said holding fixture on said reciprocating table, said mounting means including means permitting rotation of said holding fixture about an axis normal to the plane of reciprocation of said table and means permitting swinging of said holding fixture about an axis parallel to said plane, power means for reciprocating said table, power means carried by said table for rotating said fixture, said last power means being mounted for swinging about said parallel axis, and means for swinging said fixture and said last power means in unison.

2. In combination with a tool grinder having a linearly reciprocating table and a grinding wheel rotatably mounted in selected relationship to said table, a holding fixture for holding a tool blank, means for mounting said holding fixture on said reciprocating table, said mounting means including means permitting rotation of said holding fixture about an axis normal to the plane of reciprocation of said table and means permitting swinging of said holding fixture about an axis parallel to said plane, power means carried by said table for rotating said fixture in timed relationship with the movement of said table, means mounting said power means for swinging about said parallel axis, and manually operable means for swinging said fixture and said power means in unison.

3. In combination with a tool grinder having a linearly reciprocating table and a grinding wheel rotatably mounted in selected relationship to said table, a holding fixture for holding a tool blank, means for mounting said holding fixture on said reciprocating table, said mounting means including means permitting rotation of said holding fixture about an axis normal to the plane of reciprocation of said table and means permitting swinging of said holding fixture about an axis parallel to said plane, power means carried by said table for rotating said holding fixture, and means carried by said fixture and mounting means for controlling operation of said power means operable automatically to start and stop rotation of said fixture in timed relationship with the reciprocation of said table.

4. The combination set forth in claim 3 wherein said control means comprises a limit switch carried by said fixture mounting means and a tab carried by said fixture adapted to engage said limit switch.

5. A tool grinding fixture adapted to be used with a grinder having a linearly reciprocating slide and a grinding wheel rotatably mounted on a horizontal axis perpendicular to said slide, said fixture comprising a base, a rotatable table mounted on said base, means on said table for supporting a tool in grinding relation to the grinder wheel of the grinder when said fixture is mounted on the grinder slide, means carried by said base for rotating said table about an axis normal to the plane of movement of the grinder slide, means carried by said base for swinging said table about an axis parallel to the plane of movement of said slide, a motor carried by said base drivingly connected to said table for rotating same, and manual means for swinging said table, motor and driving connection in unison.

References Cited in the file of this patent

UNITED STATES PATENTS

| | | |
|---|---|---|
| 902,598 | Ohanian | Nov. 3, 1908 |
| 1,256,794 | Hanton | Feb. 19, 1918 |
| 1,659,228 | Williams | Feb. 14, 1928 |
| 2,142,923 | Stocking | Jan. 3, 1939 |
| 2,399,052 | McCain | Apr. 23, 1946 |
| 2,502,922 | Bura | Apr. 4, 1950 |
| 2,540,774 | Beardsley | Feb. 6, 1951 |

FOREIGN PATENTS

| | | |
|---|---|---|
| 1,003,187 | France | Nov. 14, 1951 |